No. 756,894. PATENTED APR. 12, 1904.
S. O. RICHARDSON, Jr.
FURNACE.
APPLICATION FILED MAR. 28, 1903.
NO MODEL.
6 SHEETS—SHEET 1.
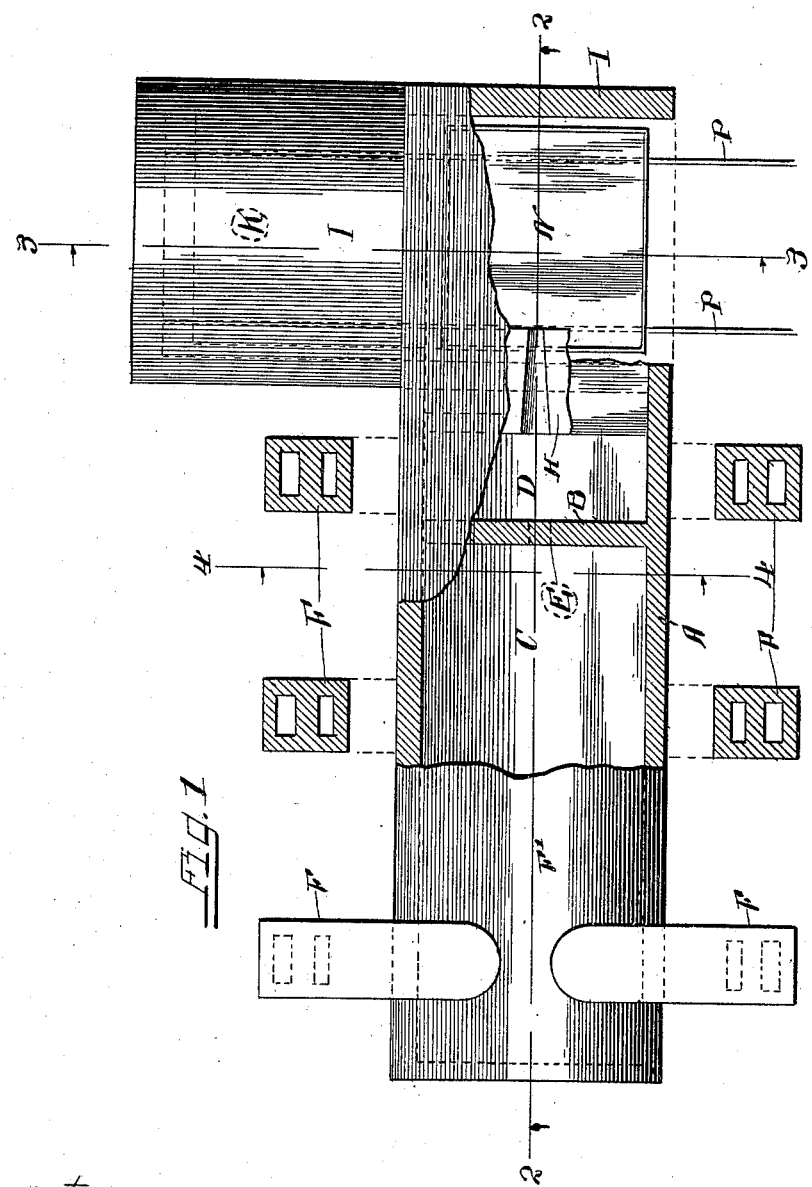

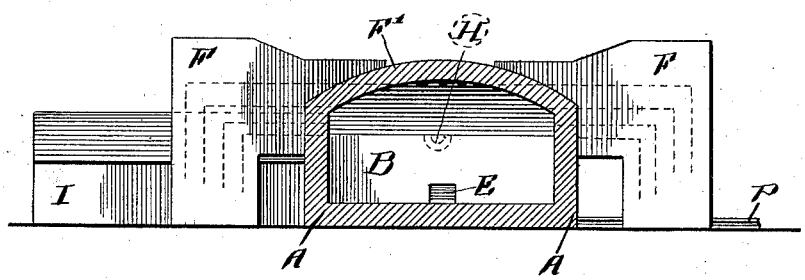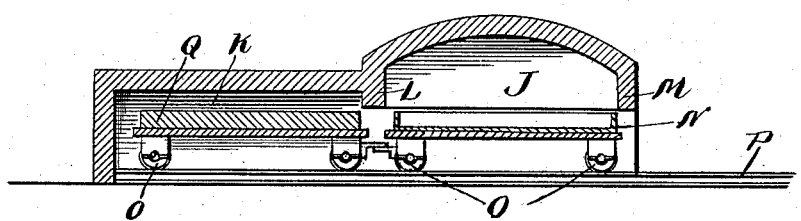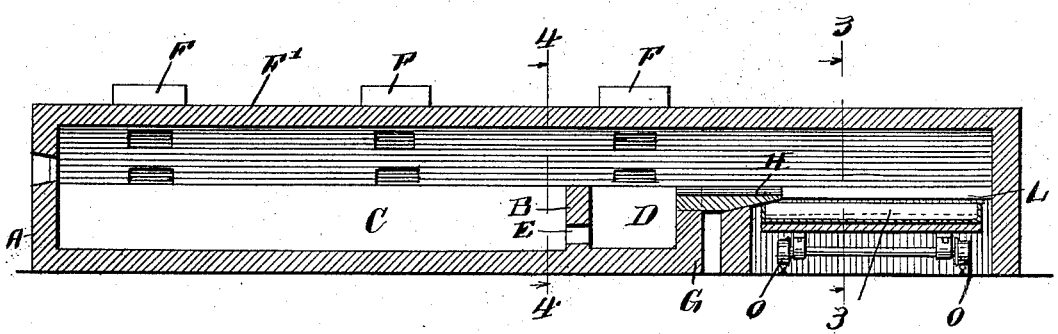

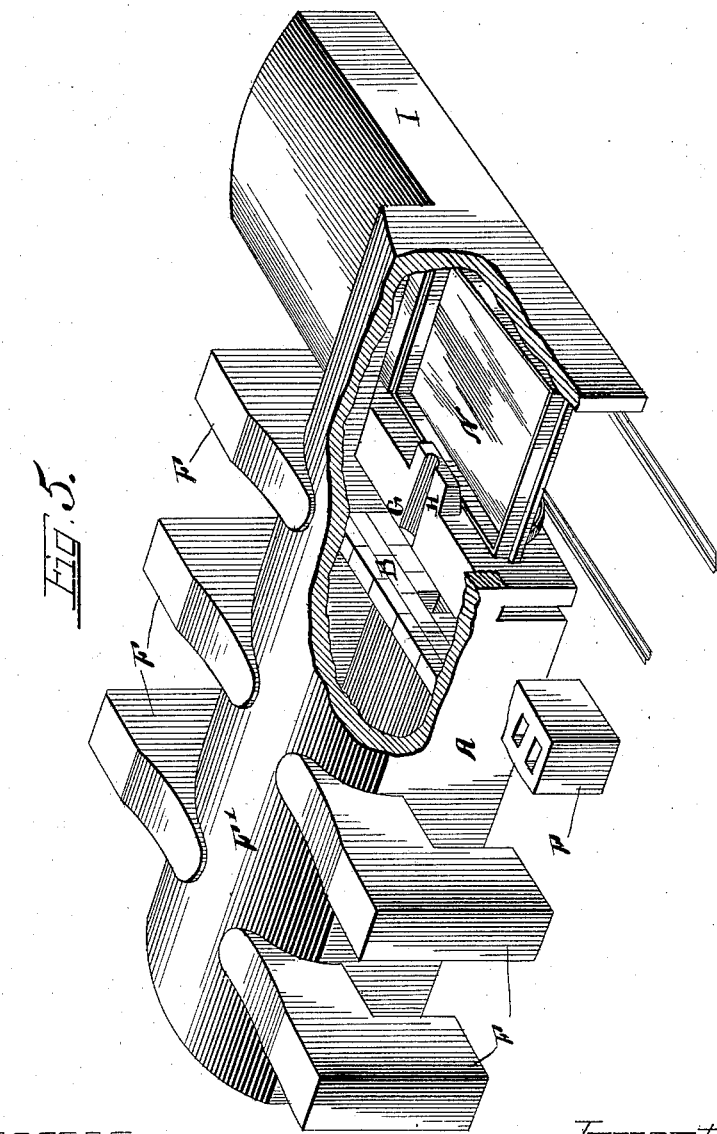

No. 756,894. PATENTED APR. 12, 1904.
S. O. RICHARDSON, Jr.
FURNACE.
APPLICATION FILED MAR. 28, 1903.
NO MODEL. 6 SHEETS—SHEET 4.
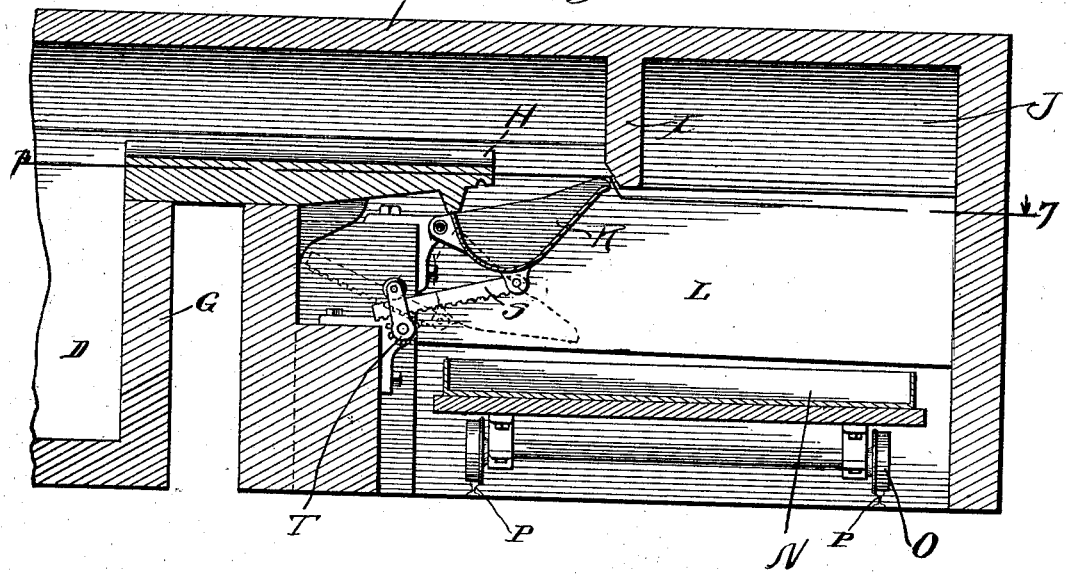
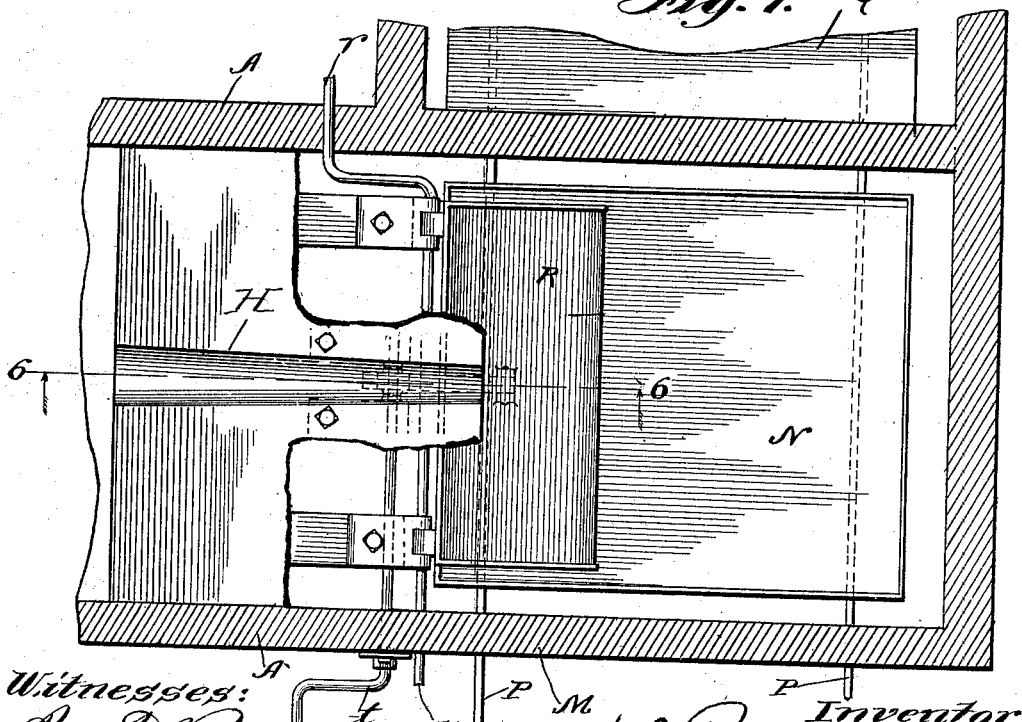

No. 756,894. PATENTED APR. 12, 1904.
S. O. RICHARDSON, Jr.
FURNACE.
APPLICATION FILED MAR. 28, 1903.
NO MODEL. 6 SHEETS—SHEET 5.

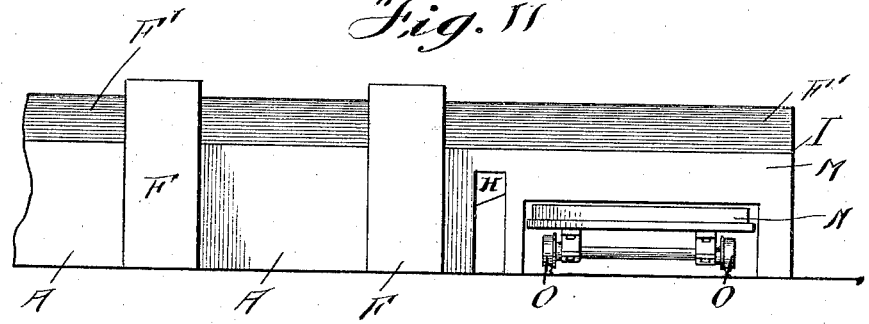
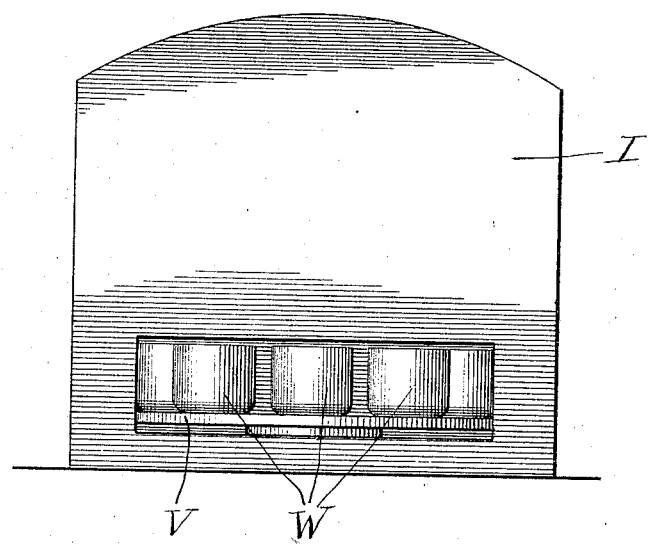
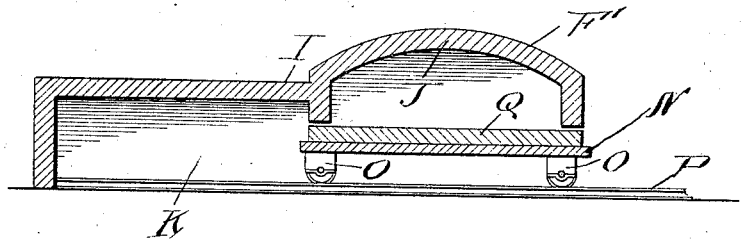

No. 756,894. Patented April 12, 1904.

UNITED STATES PATENT OFFICE.

SOLON OSMOND RICHARDSON, JR., OF TOLEDO, OHIO.

FURNACE.

SPECIFICATION forming part of Letters Patent No. 756,894, dated April 12, 1904.

Application filed March 28, 1903. Serial No. 150,008. (No model.)

*To all whom it may concern:*

Be it known that I, SOLON OSMOND RICHARDSON, Jr., a citizen of the United States, residing at Toledo, in the county of Lucas and State of Ohio, have invented certain new and useful Improvements in Furnaces, of which the following is a specification.

My invention relates to improvements in a furnace arranged for melting and for also casting glass within a compartment immediately adjoining or forming a part of the furnace.

The object of my invention is to facilitate the working of glass by providing a construction which will render it feasible to mold or cast glass directly from the working tank or by means of intermediate devices mounted within the furnace.

As is well known in this art, the nature of glass is such that to keep it in a sufficiently fluid state for working and for molding it must be maintained at a very high temperature, and when removed from the furnace the temperature of the glass rapidly falls and the glass quickly solidifies. For this reason there are practical difficulties in the way of casting glass by means of ladles or the like from the working chamber of a furnace. To overcome these difficulties, I provide my improved furnace with a casting-chamber so arranged that the temperature therein may be maintained at a sufficiently high degree. By the same heating means used to maintain the temperature in the working chamber we may insure a sufficient degree of liquidity of the glass to permit of its successful casting in molds or otherwise.

These and such other objects as may hereinafter appear are attained by the devices illustrated in the accompanying drawings, in which—

Figure 8:
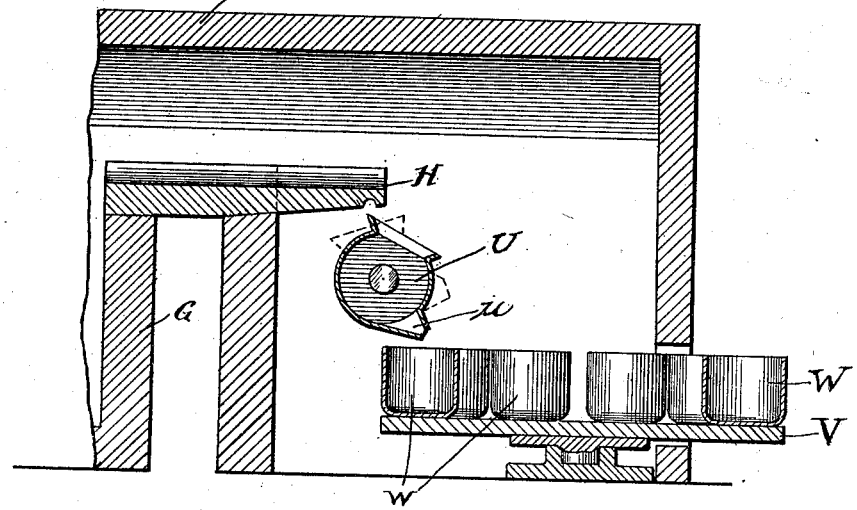
Figure 9:
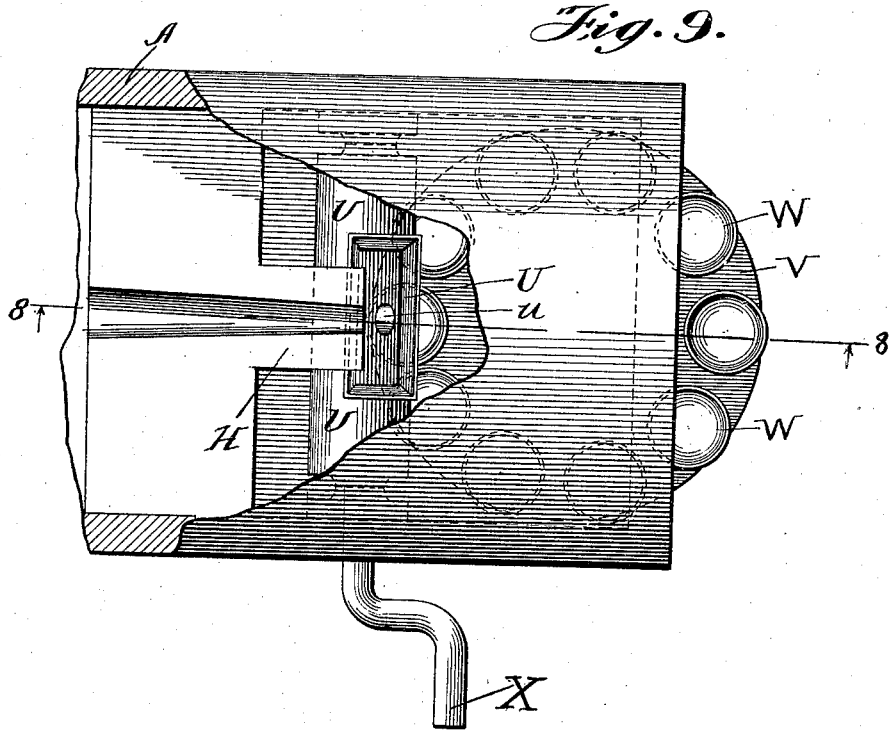

Figure 1 is a plan view of one form of furnace embodying my invention, the view showing part of the crown broken away. Fig. 2 is a longitudinal sectional view thereof on the line 2 2 of Fig. 1. Fig. 3 is a vertical sectional view on the line 3 3 of Figs. 1 and 2 looking in the direction indicated by the arrows. Fig. 4 is a transverse section on the line 4 4 of Figs. 1 and 2 looking in the direction indicated by the arrows. Fig. 5 is a perspective view showing part of the crown and walls of the furnace broken away. Fig. 6 is a sectional detail on the line 6 6 of Fig. 7 looking in the direction indicated by the arrows of a modified embodiment of my invention. Fig. 7 is a sectional plan on the line 7 7 of Fig. 6 looking in the direction indicated by the arrows. Fig. 8 is a vertical sectional detail on the line 8 8 of Fig. 9, showing another modification of my invention. Fig. 9 is a plan view of Fig. 8 with part of the crown and walls broken away. Fig. 10 is an elevation of Fig. 9. Fig. 11 is a side elevation of Fig. 1. Fig. 12 is the same as Fig. 3, except that the casting-table is removed and the blank is in closed position.

Like letters of reference indicate the same parts in the several figures of the drawings.

Referring by letter to the accompanying drawings, A indicates the outer walls of a familiar form of tank-furnace, said furnace being divided by a bridge-wall B into a reducing-chamber C and a working chamber D, connected by a passage E through said bridge-wall. The bridge-wall B does not extend to the top of the furnace.

F F indicate regenerators of any familiar type, having air and gas ports and by means of which the batch is reduced.

F' is the crown of the furnace, extending over the reducing-chamber C and the working chamber D.

The bridge-wall being of less height than the furnace, it will be obvious that there is free communication between the chambers C and D over the top of the bridge-wall. The end wall G of the furnace is also of less height than the furnace and may be, as shown, of substantially the same height as the bridge-wall and provided with a spout H.

Arranged adjacent to the wall G of the furnace is an auxiliary structure I, comprising a casting-chamber J and an adjoining chamber K. The spout H projects into the casting-chamber J, as is clearly shown in Fig. 2. The casting-chamber J is separated from the adjoining chamber K by means of an arch L, opposite to which is a second arch M, so arranged that a table N, with whatever is carried thereby, may pass thereunder. (See Fig.

11.) As illustrated in the drawings, the table N is mounted on trucks O, arranged to run on rails P. Adjacent to the table N, and preferably connected therewith in any convenient manner, is a blank or block Q, arranged to be moved along the rails P and of such dimensions that when moved into the casting-chamber J it will substantially fill all of the space between the vertical walls of said chamber, thereby shutting off communication between the interior and the exterior of the furnace.

As shown in Fig. 5, the parts are arranged for use in the manufacture of plate-glass. The furnace being of the continuous type, the metal as it fills the working chamber D will overflow through the spout H and onto the table N. The casting-chamber being in free communication over the walls G and B with the interior of the furnace, a fierce heat will be radiated into the casting-chamber and above the table N and of a sufficiently high temperature to maintain the glass in a liquid condition while the plate of glass is being cast upon the table N. Whenever sufficient glass has flowed upon the table N, the flow of glass is shut off in any convenient and well-known manner, and the table N is drawn out upon the rails P and under the arch M, while at the same time the blank Q, following the table N, is moved into the casting-chamber J and substantially shuts off all communication between the furnace and the outer air through the casting-chamber J, thereby preventing any material lowering of the temperature within the casting-chamber J. (*Vide* Fig. 12.) The table N or another table like it is again moved into the casting-chamber J, and the blank Q is simultaneously moved back into the adjacent chamber K, and the operation is repeated, as before.

In Fig. 6 I have shown means for increasing the efficiency of the apparatus by mounting within the casting-chamber a pivoted ladle R. When this ladle is used, the casting-chamber may be constructed as previously described; but I prefer constructing it with a downwardly-depending wall or arch $i$, so arranged opposite the spout H that when the ladle R is in raised position, as shown in Fig. 6, it will substantially close the opening between the spout H and the wall or arch $i$. When so constructed, the spout H should be widened, as shown in Fig. 7, to provide a roof or housing over the operating parts mounted under the ladle R. The object of this arrangement is to protect the operating mechanism from the influence of a too fierce and continued heat, while at the same time the ladle, which of course will be formed of some suitable refractory material, and its contents are kept most of the time within a temperature sufficient to keep the glass in a liquid condition. The ladle R will be preferably pivoted upon a hollow bar $r$, which may be kept sufficiently cool by the passage of a stream of water therethrough. It may be conveniently operated by means of a rack-bar S, pivotally attached thereto and meshing with a gear-wheel T, which is mounted upon and operated by a rod $t$, which extends through one of the outer walls of the furnace, the rack-bar being held in mesh with the gear-wheel by any suitable guide. When so constructed, the furnace may be operated in several ways. For instance, by making the ladle R of sufficient capacity it will remain in the position shown in full lines in Fig. 6 until the required amount of metal has flowed therein, whereupon the entire amount of glass required for casting will be quickly emptied in one pass upon the casting-table by moving the ladle to casting position, (shown in dotted lines in Fig. 6,) the ladle meanwhile catching the continued flow of metal through the spout H and the ladle being immediately returned to closed position. While with this construction and mode of operation the operating parts are sufficiently housed from destructively intense heat, the ladle and its contents are kept under the influence of the higher temperature, while the temperature within the casting-chamber is kept sufficiently high to permit the casting of the metal before it becomes cooled to such a degree as to make casting impracticable. On the other hand, with the modification shown in Fig. 6, the ladle R may be used merely as a drip-ladle for the purpose of catching the flow of metal between castings, whereupon as soon as the casting-table is returned to casting position the ladle is moved to the position shown in dotted lines in Fig. 6, thereby temporarily opening freer communication between the interior of the furnace and the casting-chamber, which communication remains open while the metal flows through the spout H into the ladle R and thence to the casting, whereupon the flow of metal onto the casting-table is shut off by raising the ladle R to closed position.

In Figs. 8 and 9 I have shown another modified form of my furnace in which I use a cylindrical ladle U, pivotally mounted below the spout H and provided with a casting-spout $u$, the top of the ladle immediately adjacent to the spout H being open. In connection with this modification I can conveniently use a pivoted casting-table V, extending partially outside of one wall of the casting-chamber and arranged to support a number of molds W. The cylindrical ladle U may be conveniently operated by a crank-arm X, extending outside of the furnace and arranged to move the ladle upon its pivot. In using this modified form of my invention the ladle U is normally in the position shown in dotted lines in Fig. 8. The table V is rotated upon its pivot, the molds W being placed in order upon the exposed portion of the top of the table, which projects outside of the furnace, and being brought in turn under the spout $u$ of the ladle U. By means of any convenient peep-hole the position of the molds can be watched, and as each mold in turn comes under the ladle U the ladle will be tipped to casting position, as shown in Fig. 8, and will be returned to the position shown in dotted lines in Fig. 8 as each casting is completed. The continued rotation of the table V in turn brings each filled mold outside of the furnace, where it can be removed and replaced by an empty mold, and so the casting process can be carried on continuously.

The modifications as shown and described are merely illustrative of some of the numerous ways in which my invention may be utilized without departing from the spirit thereof, the broad idea of my invention being a furnace provided with a casting-chamber so arranged that the molds, casting-table, or the like may be readily withdrawn therefrom and inserted therein, while at the same time the temperature therein may be maintained at a sufficiently high degree to insure the fluidity of the glass during its casting either in molds or otherwise. This is preferably attained by having the casting-chamber in free communication with the interior of the furnace, as shown, although other means to this end may be utilized.

I reserve the right to cover such specific modifications as are here shown, but not claimed, by a separate application.

It will be observed that the temperature within the casting-chamber is maintained at a high degree not only because the openings for the insertion and withdrawal of the molds are so arranged and gaged as to admit a minimum of cold air, but also because such openings are so located that the entrance of cold air is opposed by the confined and expanded body of highly-heated air within the casting-chamber, the tendency being for such highly-heated and so expanded air to force its way out of the chamber rather than to permit the entrance of cold air.

I claim—

1. In an apparatus of the class described, a furnace provided with a working chamber and a casting-chamber in free communication therewith, said casting-chamber being provided with an opening leading to its exterior, the upper part of said opening being arranged below the level of the metal-line in the working chamber, a movable carrier arranged to be moved into and out of said casting-chamber through said opening, molding means carried by said carrier, means for conveying fluid metal from said working chamber and into said molding means, said elements being so arranged and proportioned that the movable carrier and the molding means carried thereby will serve to effectively close the opening from the casting-chamber to its exterior while the carrier and molding means are in said chamber, so that the temperature of the casting-chamber may be kept at a sufficiently high temperature to maintain the fluidity of the glass as it flows from the working chamber into the molding means in the casting-chamber.

2. An apparatus of the class described, comprising the combination with a furnace provided with a casting-chamber, of means for maintaining glass in a fluid condition within said chamber, a casting-ladle mounted within said chamber, means for supplying metal to said ladle, and means for operating said ladle from the outside of said chamber, said means comprising a shaft, a gear carried by said shaft, a toothed link pivoted to said ladle and held in operative engagement with said gear-wheel, and means for rotating said shaft.

3. A device of the class described, comprising a closed casting-chamber, means for maintaining glass in a fluid condition within said chamber, a casting-ladle mounted within said chamber, means for operating said ladle from the outside of said chamber, said chamber being provided with an opening leading to its exterior, so arranged and proportioned that a casting-table may be inserted into and removed from said casting-chamber therethrough without sufficiently cooling said chamber to materially interfere with casting the metal therein.

4. A device of the class described, comprising a working chamber, a casting-chamber in free communication therewith, means for heating said casting-chamber, a casting-ladle pivotally suspended within said casting-chamber, means for operating said ladle from the outside of said casting-chamber, means for supplying metal to said ladle, and an opening so arranged and proportioned in one wall of the otherwise closed casting-chamber as to permit molds to be passed into and out of said chamber without so cooling the chamber as to interfere with the casting of the metal therein.

5. The combination with a glass-furnace, of a casting-chamber, means for sufficiently heating said casting-chamber for the purpose described, and a casting-table arranged to form a false bottom for the casting-chamber and to substantially close communication between the casting-chamber and its exterior.

6. The combination with a glass-furnace, of a casting-chamber, means for sufficiently heating said casting-chamber for the purpose described, a casting-table arranged to form a false bottom for the casting-chamber and to substantially close communication between the casting-chamber and the outer air, an auxiliary chamber arranged adjacent to and in communication with said casting-chamber, a block arranged adjacent to said casting-table and extending into said auxiliary chamber and adapted to follow the casting-table when the same is withdrawn from the casting-chamber, so that said block will form a false bottom to the casting-chamber and will substantially close communication between said chamber and the outer atmosphere when the casting-table is removed from said chamber.

7. A glass-furnace, comprising a tank for molten glass, means for keeping the glass fluid in said tank, a casting-chamber arranged adjacent to said tank and in free communication therewith above the metal-line, means for providing an air-space between said chamber and said tank, movable molding means within said casting-chamber, and a conduit arranged to conduct metal in a narrow stream from said tank, over said air-space, and into said molding means in said casting-chamber.

8. A glass-furnace, comprising a tank for molten glass, a casting-chamber arranged adjacent thereto and in such free communication therewith, above the metal-line, that the means for maintaining the glass in a molten condition in said tank may also be used to maintain the glass in a sufficiently molten condition in said casting-chamber, a conduit leading from said tank to said casting-chamber below the metal-line, and removable molding means arranged in said casting-chamber, below the discharge end of said conduit, so as to receive metal from said conduit, said molding means being also arranged so as to substantially close communication between the casting-chamber and the atmosphere.

9. The combination with a glass-furnace provided with a reducing-chamber and a closed casting-chamber in communication therewith, of a casting-ladle mounted in said casting-chamber and arranged to receive metal from the reducing-chamber and to pour the same in the casting-chamber, and also adapted to close communication between said chambers while said ladle is receiving metal.

SOLON OSMOND RICHARDSON, JR.

Witnesses:
 W. F. DONOVAN,
 C. I. HILLS.